J. C. COVERT.
Rope-Clamp.
No. 208,157. Patented Sept. 17, 1878.
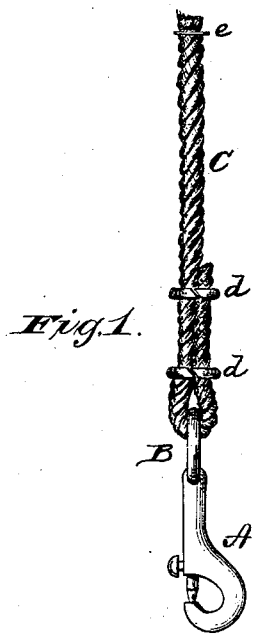
Fig.1.
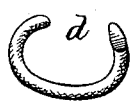 Fig.2. 
WITNESSES
Franck L. Ouraud
J. J. McCarthy.
BY
INVENTOR
Jas. C. Covert,
Alexander Mason
ATTORNEYS
N. PETERS, PHOTO-LITHOGRAPHER, WASHINGTON, D. C.

UNITED STATES PATENT OFFICE.

JAMES C. COVERT, OF TROY, NEW YORK.

IMPROVEMENT IN ROPE-CLAMPS.

Specification forming part of Letters Patent No. 208,157, dated September 17, 1878; application filed July 25, 1878.

*To all whom it may concern:*

Be it known that I, JAMES C. COVERT, of Troy, in the county of Rensselaer, and in the State of New York, have invented certain new and useful Improvements in Clamping and Securing Rope Ends; and do hereby declare that the following is a full, clear, and exact description thereof, reference being had to the accompanying drawings, and to the letters of reference marked thereon, making a part of this specification.

The nature of my invention consists in the construction of a device for connecting and confining the doubled ends of ropes or cords, and for preventing the untwisting or unraveling of the ends of single cords, as will be hereinafter set forth.

To enable those skilled in the art to make and use my invention, I will proceed to describe its construction and operation.

In the accompanying drawings, making part of this specification, Figure 1 represents a plan view of a rope or cord connected to a snap-hook ring, while Fig. 2 represents views of open rings which are used for fastenings.

In the figures, A represents a snap-hook, with a ring, B, connected to it at one end. Through this ring B is passed a cord or rope, which has its end turned down, as seen, and resting against the main body. $d\,d$ represent metallic open rings. These rings are made of suitable diameter, of metal, to give them strength for the purpose for which they and the ropes are intended to be used. The ends of the rings are preferably cut in beveled form, and when the end of the rope or cord is passed through a ring and bent down, and the two parts are confined, as seen in Fig. 1, by the rings, the beveled ends overlap each other in such manner that if there should be a tendency of the rings to spread their beveled edges would bind against each other, and have to pass each other before the pressure upon the ropes would be relieved.

Supposing that I intend to pass a one-inch rope through a ring, B, of any suitable size, when the end is bent down, as seen in Fig. 1, I apply sufficient pressure to the rope and to the surrounding rings $d\,d$ to reduce the actual diameter of the two ropes within the ring to about one-half, or to about the diameter of one portion or the body of the rope. The two parts, thus being, as it were, united by extreme pressure, and then confined together by a metallic ring, cannot separate or have any endwise draw.

I may use one or more rings, as the case may require. The end of a single cord may be compressed and an open ring placed around it to prevent untwisting or unraveling, as seen at $e$, Fig. 1.

This is a very simple, cheap, and effective mode of connecting ropes or cords to any object.

The compression must be made with great power to close the rings $d$ upon the rope or ropes in a suitable manner. A machine or instrument for this purpose is almost absolutely required, inasmuch as hand-pressure would be inadequate for the purpose.

I do not wish to be understood as claiming the common and well-known idea of twisting a wire around a rope for connecting the braids together; nor do I wish to claim an open ring, such as key-rings, &c.; but I do wish to be understood as denying that any rope or ropes have ever been clamped by an open ring under extreme pressure, as I have shown, described, and claim.

Having thus fully described my invention, what I claim as new, and desire to secure by Letters Patent, is—

1. The herein-described method of connecting one part of a rope adjacent to another part, or the ends of two ropes, by clamping the same with one or more open rings, of metal, under extreme pressure, as set forth.

2. One or more open rings clamped around a braided or twisted rope under pressure, to prevent unbraiding or untwisting, as set forth.

In testimony that I claim the foregoing I have hereunto set my hand this 17th day of July, 1878.

JAMES C. COVERT.

Witnesses:
FRANK GALT,
J. J. MCCARTHY.